Patented Sept. 13, 1938

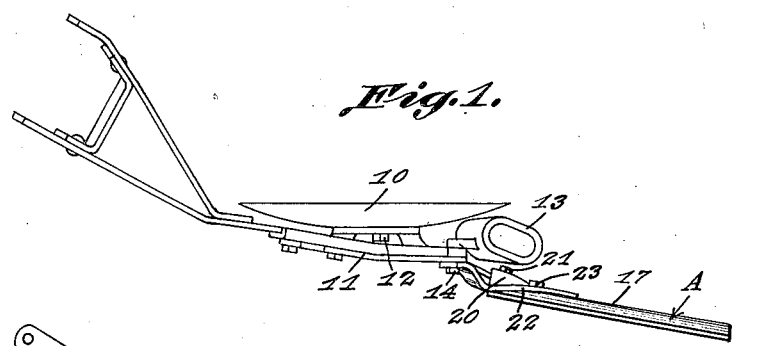
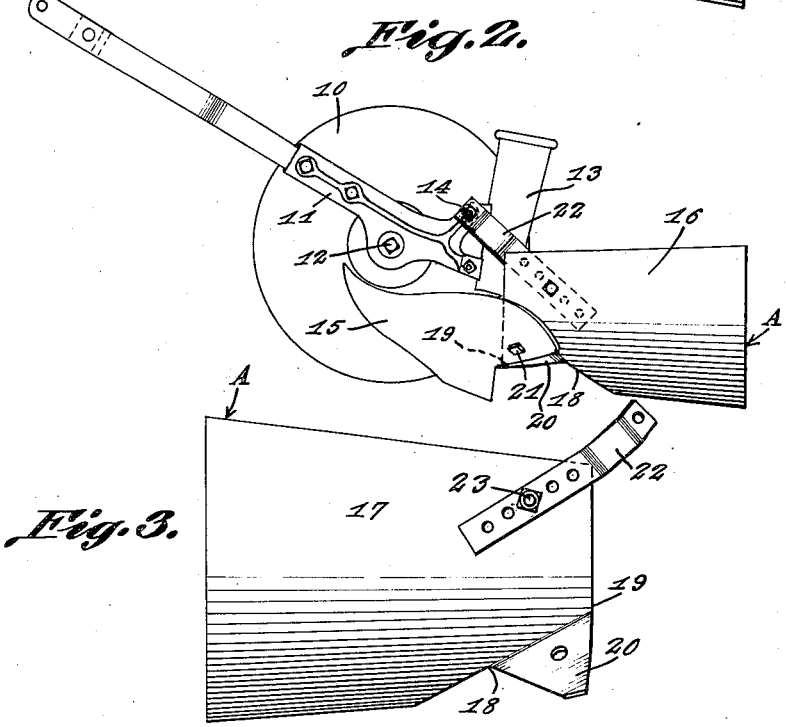

2,129,977

UNITED STATES PATENT OFFICE 2,129,977

ATTACHMENT FOR LISTER DISK FURROW OPENERS

Carl W. Wurtele, Chappell, Nebr.

Application December 27, 1937, Serial No. 181,857

3 Claims. (Cl. 111—87)

My invention relates to new and novel improvements in attachments for lister disk furrow openers.

One of the principal objects of my invention is to provide an attachment capable of being secured to a lister disk furrow opener and operable therewith for preventing large and hard clods of soil from entering the furrow after the grain planting operation, thus increasing the yield of the crop, it being well known that said large and hard clods retard and often destroy the growth of the grain on which they lie.

Another object of my invention is to provide a device of the above described character adapted for attachment to furrow openers already in use without modifying the same.

A further object of my invention is to provide a device of the above described character operable to permit soft and small lumps of soil to be returned to the furrow for covering the grain planted and at the same time acting to prevent the entrance of the large hard clods by positioning them in ridge formation adjacent the open furrow.

Other objects and advantages will be apparent from the following description, appended claims and annexed drawing.

Referring to the drawing wherein like reference characters designate like parts throughout the several views:

Fig. 1 is a top plan view of my invention illustrating the same connected to a lister disk furrow opener.

Fig. 2 is a side elevation thereof.

Fig. 3 is a detail side elevation of my invention on an enlarged scale.

Fig. 4 is a top plan view of Figure 3.

In teaching my invention there is illustrated in the drawing a lister disk furrow opener of a typical construction equipped with the usual disk 10 pivotally mounted on a supporting bracket 11 as at 12. A grain conduit 13 is adjustably and detachably secured to said bracket by a bolt 14. A guard shoe 15 is detachably connected to the lower extremity of the grain conduit by suitable means (not shown) and it is to this and to the said bracket 11 that the front end of my attachment is secured.

My attachment or ridge builder comprises an elongated metal body A, preferably constructed of sheet steel. The upper and lower edges of said body taper towards each other at the front thereof and said body is of an arcuate configuration in cross section thereby presenting concave outer and convex inner faces 16 and 17 respectively. The lower longitudinally extending section of said body is notched as at 18 adjacent the front end 19. The lower corner 20 of said front end is inflected outwardly from the convex face 17 and is secured to the rear section of the shoe 15 by means of a bolt 21.

An arm 22 is adjustably secured on the convex face 17 of the body by means of a bolt and nut 23, a series of apertures being formed in said arm for receiving said bolt whereby said arm may be adjusted relative to the body. The arm is disposed on the body at an angle relative to the length thereof and extends beyond the upper front corner of the body for connection with the bracket 11 by means of the bolt 14 heretofore described.

From the foregoing it will be apparent that the attachment is disposed rearwardly of the disk 10 and shoe 15 and forward movement of the opener will cause the attachment to follow the disk 10 and shoe 15, thereby laterally displacing clods of earth outwardly from the furrow. As this operation progresses, small particles and lumps of soil will pass under the notched section 18 and be distributed over the planted grain and large lumps or clods of soil will be prevented from passing into the furrow and become stacked in a ridge adjacent the furrow and thus keeps the soil from blowing.

Furthermore, due to the elimination of the clods, the seed has a greater assurance of growth into sturdy plants; thus permitting a reduction in the extra amount of seed used to take care of non-germination or poor growth of some of the seed because of soil conditions, thereby effecting an economy as to seed.

What I claim is:

1. An attachment of the class described, comprising, an elongated body adapted for attachment to a furrow opener equipped with a furrow disk and shoe and in rear of the furrow disk and shoe, said body notched in the lower section thereof to permit a grading of the soil for distribution within the furrow formed by said disk and shoe.

2. An attachment of the class described, comprising, an elongated body adapted for attachment to a furrow opener equipped with a furrow disk and shoe and in rear of the furrow disk and shoe, said body formed with an outer concave face and an inner convex face and a notched section on the lower part of body for grading soil passing therethrough whereby to prevent undesirable clods of soil being distributed within the furrow formed by said disk and shoe.

3. A device of the character described, comprising, in combination, a furrow opener having a bracket, a disk mounted on said bracket, a shoe and a grain conduit, an elongated body having a lower end attached to said shoe and an upper end attached to said bracket, said body disposed longitudinally in the rear of said shoe and fashioned with a notched section adjacent the connection with said shoe whereby to prevent undesirable clods of soil from passing therethrough into a furrow formed by said disk and shoe.

CARL W. WURTELE.